United States Patent [19]

Edelmayer

[11] Patent Number: 4,640,641
[45] Date of Patent: Feb. 3, 1987

[54] PISTON PIN CONSTRUCTION AND METHOD FOR FORMING SAME

[75] Inventor: Thomas C. Edelmayer, Mobile, Ala.

[73] Assignee: Teledyne Continental Motors, Mobile, Ala.

[21] Appl. No.: 863,816

[22] Filed: May 12, 1986

Related U.S. Application Data

[63] Continuation of Ser. No. 634,365, Jul. 25, 1984, abandoned.

[51] Int. Cl.⁴ .................. F16D 1/12; B21D 39/00
[52] U.S. Cl. ........................... 403/150; 403/282; 29/522 R
[58] Field of Search .......... 403/282, 284, 274, 150, 403/151, 152, 153; 29/522 R, 512, 523, 187; 16/114 R

[56] References Cited

U.S. PATENT DOCUMENTS

| 1,769,474 | 7/1930 | Svenson | 403/151 |
| 1,772,187 | 8/1930 | Manning | 403/151 |
| 1,943,364 | 1/1934 | Betz | 403/153 |
| 2,100,525 | 11/1937 | Sorensen | 403/151 |
| 2,295,199 | 9/1942 | Carvelli | 403/154 |
| 2,687,930 | 8/1954 | Smith | 403/150 |
| 2,806,752 | 9/1957 | Ginn | 403/153 |
| 2,990,226 | 6/1961 | Fangman | 403/151 |
| 3,030,850 | 4/1962 | Minor et al. | 29/522 |
| 3,126,568 | 3/1964 | Wubbe | 29/522 |
| 3,245,705 | 4/1968 | Fangman | 403/154 |
| 4,076,430 | 2/1978 | Crook, Jr. | 403/154 |
| 4,364,159 | 12/1982 | Holcombe | 29/522 R |

FOREIGN PATENT DOCUMENTS

| 120409 | 9/1945 | Australia | 29/522 |
| 0070205 | 1/1983 | European Pat. Off. | 16/114 R |
| 914211 | 5/1954 | Fed. Rep. of Germany | 403/153 |
| 320830 | 10/1929 | United Kingdom | 29/522 |

Primary Examiner—Cornelius J. Husar
Assistant Examiner—Peter M. Cuomo
Attorney, Agent, or Firm—Gifford, Groh, VanOphem, Sheridan, Sprinkle and Dolgorukov

[57] ABSTRACT

A piston pin comprising a tubular body enclosed by end caps, the end caps being secured to the tubular body by an extrusion extending into a recess in the inner periphery of the tubular body, and said extrusion being formed when said end cap is hammered into the tubular body so that an end of the end cap abuts against an annular wall in the tubular body adjacent the recess to force the end cap material into the recess. Preferably, the end cap includes an axial bore, and a transverse bore for communicating between the axial bore and the periphery of the cap, and the transverse bore is positioned so that it communicates with an area adjacent a tapered end portion of the tubular body. In a preferred method of forming piston pins according to the present invention, the tubular body is heated before the plug is hammered into position within the end of the tubular body. Once the end cap has been installed in the tubular body, the end cap and the axial end of the tubular body can be finish machined as desired.

6 Claims, 2 Drawing Figures and PISTON PIN CONSTRUCTION AND METHOD FOR FORMING SAME This is a continuation of co-pending application Ser. No. 634,365 filed on July 25, 1984, now abandoned.

BACKGROUND OF THE INVENTION

I. Field of the Invention

The present invention relates generally to reciprocating piston mechanisms as are used in internal combustion engines and more particularly to the construction of a piston pin used for connecting the piston to a connecting rod.

II. Description of the Prior Art

Piston pins are commonly employed to pivotally connect a piston to a connecting rod for reciprocating movement of the piston in response to rotation of the crank shaft or the like. While some previously known piston pins have been made of a solid shank of metal, such piston pins unduly increase the weight of the piston assembly. Moreover, such pins may not dissipate heat as quickly as is necessary to avoid fracturing or fatigue in the piston pin.

In addition, some previously known piston pins have been formed from a tubular body so that the pins are hollow to reduce the mass of the piston assembly. However, tubular piston pins can be deformed during reciprocal movement of the piston, especially when subjected to the high pressures and temperatures existing within the cylinder and the mechanical stresses associated with reciprocating displacement due to combustion. As a result, it has previously been known to completely fill the entire tubular chamber of the piston pin to close the ends of the piston pin. However, such a construction can still result in an unduly massive piston assembly, and the operation of filling the chamber of tubular piston pin can be extremely expensive. For example, formation of a one-piece filler within a tubular pin requires highly controlled introduction of the filler so as to avoid cavities and incomplete filling of the tubular pin.

In order to avoid these complications, some previously known tubular piston pins have been enclosed by end caps which frictionally engage the inner periphery of the pin. Such end caps are substantially easier to manufacture and install than previously known means for sealing the ends of a tubular piston pin. However, such end caps have been known to loosen during operation of the piston, probably due to the pressures in the cylinder and mechanical forces which cause deformation of the piston pin during reciprocatory movement of the piston. Unfortunately, end plugs which loosen can cause extensive engine damage.

SUMMARY OF THE PRESENT INVENTION

The present invention overcomes the above mentioned disadvantages by providing a piston pin construction in which end caps are positively engaged within the ends of a tubular piston pin by an extrusion formed during installation of the end cap. The tubular body of the piston pin includes a recess adapted to receive the extrusion as well as a means for extruding a portion of the end cap into the recess when the end cap is forcibly driven into the tubular body. The end cap can be formed in a simple cylindrical shape although it is preferred that the end cap include a tubular end portion having a tapered annular wall that serves to guide the extrusion into the recess of the tubular body of the pin.

In the preferred embodiment, a hollow portion of the end cap can communicate through a bore in the end cap with the exterior of the end cap to provide restricted communication between the cylinder and the interior of the piston pin. In such a case, the tubular body of the pin preferably includes tapered end portions registering with the bore in the end cap. Also in the preferred embodiment of the present invention, the means for extruding a portion of the cap into the recess comprises an annular wall extending radially inwardly from the periphery of the tubular body of the piston pin adjacent to the recess. Although the wall need not be perpendicular to the axis of the tubular body in order to be within the scope of the present invention, it is necessary that the wall extend radially inwardly farther than the inner periphery of the end of the tubular body of the piston pin.

Moreover, the end cap preferably has a length greater than the distance between the recess and the axial end of the tubular body so that it is easily engaged for driving into the end of the tubular body. It is contemplated that the axial ends of the tubular body as well as the end caps can be machined after insertion of the end caps to provide a desired finish to the ends of the piston pin. In addition, in the preferred method of constructing the piston pin of the present invention, the tubular body is preferably heated before insertion of the end caps within the ends of the body. Then, an end cap is forcibly driven into an end of the tubular body by sudden impact such as occurs by hammering an end cap into the body whereby a portion of the end cap material is extended into the recess and forms a lip which positively retains the end cap within the piston pin.

Thus, the present invention provides a hollow piston pin which is enclosed by end caps in a simple manner. Moreover, the end caps are positively engaged within the piston pin and cannot loosen under operating condition. Moreover, the end caps can be simply constructed so as to avoid the labor and expense of producing particularly configured end caps for use with a tubular piston pin. In addition, the tubular pin itself can be simply constructed to include axial bores and an annular recess to form the piston pin of the present invention. Nevertheless, it will be understood that communication between the interior of the piston pin and the cylinder in which the piston is disposed can be provided and restricted as desired upon formation of a simple bore within the end cap. As a result, the present invention provides a simple and more effective means for enclosing the ends of a tubular piston rod which is substantially less expensive than previously known tubular piston pin constructions.

BRIEF DESCRIPTION OF THE DRAWINGS

The present invention will be better understood by reference to the following detailed description of a preferred embodiment of the present invention when read in conjunction with the accompanying drawing in which like reference characters refer to like parts throughout the views and in which.

DETAILED DESCRIPTION OF A PREFERRED EMBODIMENT OF THE PRESENT INVENTION

Figure 1:
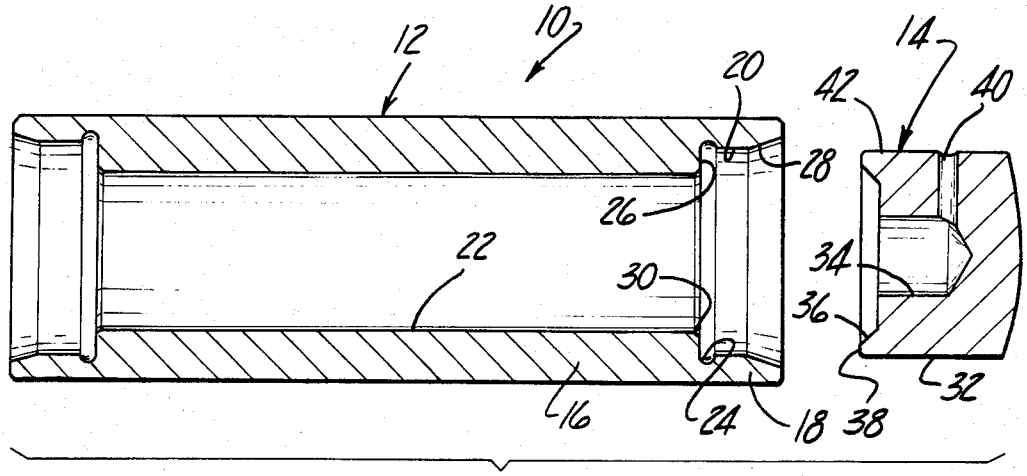
FIG. 1 is an exploded sectional view of a piston pin constructed in accordance with the present invention.
Figure 2:
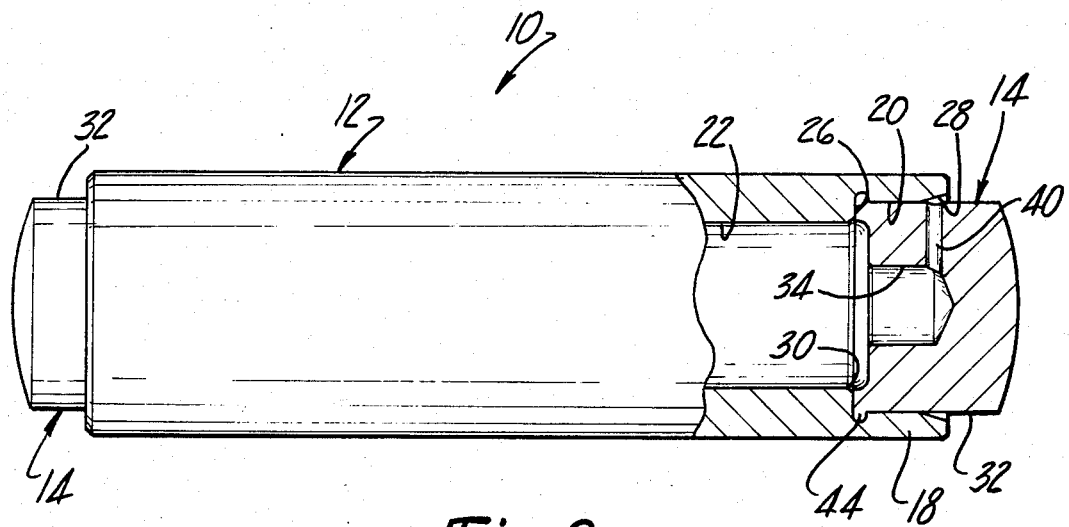
FIG. 2 is a front plan view of an assembled piston pin as shown in FIG. 1 with portions broken away for the sake of clarity.

Referring first to FIG. 1, piston pin 10 according to the present invention is thereshown comprising a tubular piston pin body 12 to be enclosed by plugs or end caps 14 (one shown in FIG. 1). The tubular body 12 is substantially cylindrical so that a correspondingly configured end cap 14 is adapted to be received in an axial end of the tubular body 12. The peripheral wall 16 of the tubular body 12 includes a pair of end portions 18 whose inner periphery 20 has a larger diameter than the inner periphery 22 of the central portion of the tubular body 12. The tubular body 12 also includes a radially extending annular recess 24 at the innermost end of the inner periphery 20 of end portions 18. Since the inner periphery 22 at the center of the tubular body 12 has a smaller diameter than the diameter of the inner periphery 20 at the end portion 18, an annular wall portion 26 extends radially inwardly from peripheral wall 16 and forms an a ledge against which the cap 14 can be driven by hammering or the like to deform the innermost end of the cap 14 and extrude it into the recess 24. As is also shown in FIG. 1, the inner periphery 20 includes a tapered end portion 28. In addition, the tip of the annular wall 26 is chamfered as shown at 30.

The end cap 14 includes a substantially cylindrical body 32. In the preferred embodiment, the end cap 14 includes an axial bore 34 having an enlarged bore portion 36 which tapers outwardly toward the end of the cap 14, and having a narrow abutment surface 38 at the innermost end of the cap 14. A transverse bore 40 communicates between the periphery 42 of the end cap 14 and the axial bore 34. The transverse bore 40 is positioned so that its outermost end is spaced apart from the abutment surfacd 38 a distance greater than the distance between the annular wall 26 of the tubular body 12 and the axial end of the tubular body 12.

The periphery 42 of end cap 14 is preferably dimensioned so as to frictionally engage the inner periphery 20 at the end of the tubular body 12. Furthermore, the end cap 14 is preferably made of an aluminum alloy which provides the desired material property of deformability when the end cap 14 is forcibly driven into the end of the tubular body 12. Of course, other deformable materials can be used to form the end cap 14 and remain within the scope of the present invention.

Having thus described the important structural features of the present invention, the assembly of the device is easily described. The end cap 14 is axially aligned with the tubular body 12 adjacent the tapered end 28 of the tubular body 12. The end cap 14 is then forcibly driven by hammering or the like into the inner periphery 20 of the tubular body 12. Upon engagement of the abutment surface 38 with the annular wall 26, the impact of driving the end cap 14 into the tubular body 12 causes the innermost end of the end cap 14 to extrude into the recess 24. In addition, such deformation can be assisted in several ways. For example, the taper in the enlarged bore 36 of cap 14 provides a stress plane which urges the aluminum alloy material of the cap 14 radially outwardly into the recess 24. In addition, it is preferable to heat the tubular body 12 before driving the end cap 14 into the tubular body. For example, the aluminum alloy end cap 14 of the preferred embodiment can be easily driven into the tubular body 12 and locked into place when the body 12 has been heated to a temperature of about 500° F. immediately prior to insertion of the end cap 14. Once an end cap 14 has been installed in the tubular pin body 12, the axial end of the cap 14 as well as the end of the body 12 can be finish machined as desired.

In any event, it will be seen that the lip 44 formed by extrusion positively locks the end cap 14 into the tubular body 12. In the preferred embodiment, the locking engagement of the lip 44 within the recess 24 is supplemented by the frictional engagement between the periphery 42 of the end cap 14 and the inner periphery 20 of the tubular body 12. As a result, deformations of the tubular body 12 and pressure changes occurring within the piston cylinder do not affect engagement of the end cap 14 within the tubular body 12. In addition, it can be seen that the end cap 14 is locked in a position at which the bore 40 communicates exteriorly of the piston pin 10 at the tapered end 28 of the tubular body 12. Such a restricted communication between the interior of the piston pin 10 and the piston cylinder limits the effect of pressure changes within the cylinder upon the piston pin 10 while providing a means for cooling and reducing stress upon the piston pin.

Having thus described the present invention, many modifications thereto will become apparent to those skilled in the art to which it pertains without departing from the scope and spirit of the present invention as defined in the appended claims.

What is claimed is:

1. A piston pin comprising:
   a tubular body having a pair of axial ends, an inner peripheral wall at each of said axial ends, and a radially outwardly extending annular recess formed in each of said inner peripheral walls, each of said recesses being spaced axially inwardly of its associated body axial end,
   a pair of substantially cylindrical end caps dimensioned correspondingly to said inner peripheral walls so as to be receivable in said axial ends of said tubular body, and
   means for extruding a portion of said end caps into said recesses when said end caps are forcibly inserted into said axial ends of said tubular body
   wherein at least one of said caps includes an axial bore and a radial bore which intersect at one end, the other end of said axial bore being open to said tubular body and the other end of said radial bore being open exteriorly of said tubular body wherein said inner peripheral walls each include an outwardly tapered portion at its said axial end, and wherein said radial bore communicates with said outwardly tapered portion.

2. The invention as defined in claim 1 wherein said means for extruding comprises an annular wall portion extending radially inwardly of said tubular body adjacent said recess.

3. The invention as defined in claim 1 wherein said bore defining portion of said end caps is tapered outwardly for at least part of its length.

4. The invention as defined in claim 1 wherein said inner peripheral walls are tapered outwardly at said axial ends.

5. The invention as defined in claim 1 wherein when said end caps are received in said recesses the periphery of each of said end caps frictionally engages its associated inner periphery of said tubular body intermediate its associated axial end and recess.

6. The invention as defined in claim 1 wherein said end caps have a length greater than the distances between said axial ends of said tubular body and said recesses.

* * * * *